United States Patent
Persoon et al.

(10) Patent No.: US 10,948,041 B2
(45) Date of Patent: Mar. 16, 2021

(54) FRICTION MATERIAL

(71) Applicant: ROCKWOOL International A/S, Hedehusene (DK)

(72) Inventors: Fernao Joseph Cornelis Persoon, Roermond (NL); Roel Mathijs Johannes Hebben, Roermond (NL); Diego Adolfo Santamaria Razo, Eindhoven (NL)

(73) Assignee: ROCKWOOL INTERNATIONAL A/S, Hedehusense (DK)

( * ) Notice: Subject to any disclaimer, the term of this patent is extended or adjusted under 35 U.S.C. 154(b) by 0 days.

(21) Appl. No.: 16/308,149

(22) PCT Filed: Jun. 9, 2017

(86) PCT No.: PCT/EP2017/064128
§ 371 (c)(1),
(2) Date: Dec. 7, 2018

(87) PCT Pub. No.: WO2017/212029
PCT Pub. Date: Dec. 14, 2017

(65) Prior Publication Data
US 2019/0162264 A1 May 30, 2019

(30) Foreign Application Priority Data
Jun. 10, 2016 (EP) .................... 16174074.1

(51) Int. Cl.
| | | |
|---|---|---|
| *F16D 69/02* | (2006.01) | |
| *C03C 13/00* | (2006.01) | |
| *C03C 3/062* | (2006.01) | |
| *C03C 3/097* | (2006.01) | |
| *F16D 65/092* | (2006.01) | |

(52) U.S. Cl.
CPC ............ *F16D 69/028* (2013.01); *C03C 3/062* (2013.01); *C03C 3/097* (2013.01); *C03C 13/00* (2013.01); *F16D 65/092* (2013.01); *F16D 69/026* (2013.01); *F16D 2200/0065* (2013.01); *F16D 2200/0069* (2013.01); *F16D 2200/0073* (2013.01); *F16D 2200/0086* (2013.01); *F16D 2200/0091* (2013.01)

(58) Field of Classification Search
CPC ......... C03C 3/062; C03C 3/097; C03C 13/00; F16D 65/092; F16D 69/026; F16D 69/028; F16D 2200/0065; F16D 2200/0069; F16D 2200/0073; F16D 2200/0086; F16D 2200/0091
See application file for complete search history.

(56) References Cited

U.S. PATENT DOCUMENTS

| | | | |
|---|---|---|---|
| 2011/0024257 A1* | 2/2011 | Spandern | ............... F16D 69/026 192/107 M |
| 2011/0111224 A1* | 5/2011 | Lam | ..................... F16D 69/026 428/367 |
| 2013/0228403 A1 | 9/2013 | Kikudome | |
| 2017/0137319 A1* | 5/2017 | Iwata | ..................... C03C 13/00 |
| 2017/0197872 A1* | 7/2017 | Iwata | ..................... C03C 3/087 |

FOREIGN PATENT DOCUMENTS

| | | | | |
|---|---|---|---|---|
| EP | 2380857 A1 | 4/2010 | | |
| EP | 2380857 A1 * | 10/2011 | .......... | F16D 69/026 |
| WO | WO-2011131761 A1 * | 10/2011 | .......... | F16D 69/026 |
| WO | 2012085211 A2 | 6/2012 | | |
| WO | WO-2014026998 A1 * | 2/2014 | ............ | C03C 25/28 |
| WO | 2015041241 A1 | 3/2015 | | |

OTHER PUBLICATIONS

International Search Report and Written Opinion dated Sep. 13, 2017 for corresponding International Application No. PCT/EP2017/064128.

* cited by examiner

*Primary Examiner* — Anthony J Green
(74) *Attorney, Agent, or Firm* — Tarolli, Sundheim, Covell & Tummino LLP

(57) ABSTRACT

The invention provides a friction material and a method of making the friction material. The friction material comprises man-made vitreous fibres whose chemical composition comprises: less than 2 wt % $Fe_2O_3$; 30-40 wt % MgO+CaO; 35-45 wt % $SiO_2$; 17-24 wt % $Al_2O_3$; and 1-5 wt % $K_2O+Na_2O$.

15 Claims, 5 Drawing Sheets

FRICTION MATERIAL

RELATED APPLICATIONS

The present application is a U.S. National Stage application under 35 USC 371 of PCT Application Serial No. PCT/EP2017/064128, filed on 9 Jun. 2017; which claims priority from EP Patent Application No. 16174074.1, filed 10 Jun. 2016, the entirety of both of which are incorporated herein by reference.

FIELD OF THE INVENTION

The invention relates to a friction material comprising mineral fibres and a method of making said friction material.

BACKGROUND

Friction materials are widely used in a variety of applications. For instance, friction materials are required for brake or clutch devices and they are used for example in the form of brake pads, disk pads, brake shoes, brake linings and clutch facings. Examples of suitable application fields are industrial machines and transport systems or vehicles such as lifts, passenger cars, motorcycles, bicycles, trucks, railway vehicles, aircraft, baggage cars and cable cars.

The composition of friction materials may vary with respect to constituents used and the relative amounts thereof, depending on the desired properties of the friction material and the friction material system employed. Classifications of friction material systems are e.g. metallic, semi-metallic, low-steel, non-asbestos organic, NAO/non-steel and ceramic friction materials. Usually however the following components are contained in a friction material formulation: a binding agent, reinforcing fibres, fillers and frictional additives such as abrasives and lubricants.

It is known to use glass fibres in friction materials. However, the noise generation performance of such friction materials is generally not satisfactory. Other properties such as wear performance could also be improved.

Previous friction materials such as brake pads utilised copper fibres as reinforcement. Copper fibres were desirable for their high thermal conductivity such that the heat of braking could quickly be drawn away from the braking surface. However, copper is too costly for many applications, so other fibres have been used instead. In addition, friction materials that include copper are subject to regulatory pressure in many countries, so it is desirable to use a copper-free formulation.

Other previous friction materials used steel fibres. Whilst these are also capable of conducting away the heat generated at the braking surface, they are prone to rusting, noisy braking and increased weight of the friction material.

It is also known to use man-made vitreous fibres (MMVF) in friction materials. For example, Roxul® 1000, Lapinus Fibres, is known for use in brake pads. This is described in the Technical SAE Paper "Improved Performance of NAO/Non-Steel Disc Pads By Usage Extreme Low Shot (ELS) Roxul®1000 Fibres", Luc Smeets and Mark Segeren, Presented and published (2007-01-3938) on SAE Brake Colloquium 2007, Orlando, Fla., USA. Whilst these fibres are perfectly fit for purpose, nevertheless improvements could be made in the tribological performance of friction materials including MMVF, such as the wear rate of the friction material and its friction couple surface, dust generation and coefficient of friction.

WO2011/042533A1 discloses a friction material including inorganic fibre balls. Whilst the friction materials described are fit for purpose, the production method involves an inconvenient liquid binder dispersion step. Additionally, the document focuses on reducing the noise and vibration harshness of the friction material rather than improving its tribological performance.

WO2011/131761A1 discloses a friction material including chopped continuous glass fibres of at least 1 mm length. The fibres contain a high amount of $SiO_2$, which gives the fibres a higher melting point. In addition, the fibres are included in the mixture as bundles of approximately 100 fibres per bundle, giving particular mechanical and tribological properties.

PCT/EP2016/056172 discloses a friction material including MMVF as a scaffold for a conductive network. The friction material exhibits thermoelectric properties and the tribological performance is not discussed.

The present invention improves on these known MMVF-reinforced friction materials.

SUMMARY

A first aspect of the invention provides a friction material. The friction material comprises man-made vitreous fibres (MMVF) dispersed in a matrix, wherein the MMVF have a composition comprising:
  less than 2 wt % $Fe_2O_3$;
  30-40 wt % MgO+CaO;
  35-45 wt % $SiO_2$;
  17-24 wt % $Al_2O_3$;
  1-5 wt % $K_2O+Na_2O$.

Iron oxide, if present in the fibres, can be in the form of iron (II) or iron (III), but for simplicity the amounts of iron oxide are herein quoted as $Fe_2O_3$.

Preferably the MMVF have an average diameter of 3 to 6 µm, more preferably 3.5 to 5 µm. In a particularly preferred embodiment, the MMVF may have an average diameter of approximately 4 to 4.5 µm. A fibre diameter in this range may help to increase the coefficient of friction of the friction material by providing a greater density of fibres at the surface of the friction material compared to the same amount of MMVF with a larger average fibre diameter.

Preferably the MMVF contain no more than 0.5 wt % shot of size >125 µm, more preferably no more than 0.1 wt % shot of size >125 µm.

Preferably the MMVF contain no more than 1.5 wt % shot of size >63 µm, more preferably no more than 1.0 wt % shot of size >63 µm.

Preferably the MMVF contain no more than 2.0 wt % shot of size >45 µm, more preferably no more than 1.5 wt % shot of size >45 µm.

MMVF with these low levels of shot may help increase the homogeneity of the friction material and thus may increase the stability of the coefficient of friction throughout the life of the friction material. Moreover, MMVF with these low shot levels may help to reduce the noise levels of the friction material in use and may help reduce the wear on both surfaces in the friction couple in use, for example of a brake pad and rotor.

A second aspect of the invention provides a method of making the friction material of the first aspect of the invention. The method comprises the steps:
  mixing MMVF and matrix raw materials to form a mixture;
  subjecting the mixture to above-ambient pressure to form a compact; and heating the compact to form the friction material.

Compared to prior art friction materials, the friction material of the invention may offer lower wear rates, both for the friction material itself and the surface forming its friction couple, more stable coefficient of friction during use compared to known friction materials including fibres, a higher coefficient of friction and a lower dust emissions.

The combination of a less abrasive fibre and a smaller specific fibre diameter, compared to previously used MMVF, may result in a less aggressive behaviour on the disc surface in comparison to existing MMVF used in friction materials. The MMVF used in the invention may increase friction level without compromising wear and can be used in formulations to maintain a stable friction coefficient with the aim of reducing pad and disc wear. The friction coefficient of friction materials according to the invention shows improvement for speed and pressure sensitivity sections compared to known friction materials, while friction stability in general remains unaffected.

The MMVF used in the invention have a lower content of $Fe_2O_3$ compared to Roxul® fibres that are used in existing friction materials. This lower $Fe_2O_3$ content confers lower hardness as determined by nano-indentation testing of fibre surfaces. Nevertheless, when incorporated into friction materials at the same levels, the friction performance is maintained, while the wear levels of a brake block formed of the materials and of its friction couple, usually a steel disc, are significantly reduced.

The MMVF used in the invention may complement future formulations in reducing wear and therefore also may reduce dust emissions.

DETAILED DESCRIPTION

In the first aspect of the invention, the MMVF dispersed in a friction material matrix has a chemical composition comprising:
  30-40 wt % MgO+CaO;
  35-45 wt % $SiO_2$;
  17-24 wt % $Al_2O_3$;
  1-5 wt % $K_2O+Na_2O$; and
  less than 2 wt % $Fe_2O_3$.

All oxide values are of the MMVF calculated by chemical analysis and may be controlled by known methods during the melt and spinning process.

Preferably the MMVF dispersed in the matrix comprise less than 1.5 wt % $Fe_2O_3$, such as less than 1.4 wt % $Fe_2O_3$, for example less than 1.0 wt % $Fe_2O_3$. A low iron oxide content is preferred to reduce the wear rate of the friction material in which the MMVF are included.

Preferably the MMVF dispersed in the matrix comprise 34-39 wt % MgO+CaO. This amount of MgO and CaO may help to reduce the surface hardness of the MMVF and thus may contribute to a lower wear rate of the friction material compared to friction materials that contain known fibres.

Preferably the MMVF dispersed in the matrix comprise 37-43 wt % $SiO_2$.

Preferably the MMVF dispersed in the matrix comprise 18-23 wt % $Al_2O_3$.

Preferably the MMVF dispersed in the matrix comprise 2-4 wt % $K_2O+Na_2O$.

Without wishing to be bound by theory, the lower fibre diameter may increase the coefficient of friction of the friction material due to the anchoring effect provided by fibres at the surface of the friction material: an anchoring point holds in wear debris, reducing the amount of friction dust and contributing to the formation of a third body. The exposed fibre at the surface of the friction material may be called a "primary plateau" and when it is anchoring wear debris it may be called a "secondary plateau". Both primary and secondary plateaus may contribute to the formation of a stable third body in between the friction couple.

Preferably the MMVF have an average length of from 100 to 600 μm, more preferably from 110 μm to 550 μm, for example from 250 to 550 μm.

MMVF with lengths in the upper end of the range may exhibit a fibre cage effect, in which fibres fold back on themselves to form a cage or nest shape. The cage or nest may trap wear debris, contributing to both dust reduction and the formation secondary plateaus, which themselves may aid the formation of a stable third body layer. Fibres longer than 600 μm may result in an unacceptable level of inhomogeneity in the friction material.

MMVF with lengths in the lower end of the range may exhibit a very high anchoring effect as the number density of fibres may be higher and thus the number of anchoring points per unit area of the friction material surface may be higher. By this mechanism, a high number of secondary plateaus are facilitated, which may in turn contribute to the formation of a stable third body layer. Fibres shorter than 100 μm may result in insufficient mechanical reinforcement of the friction material.

Figure 1:
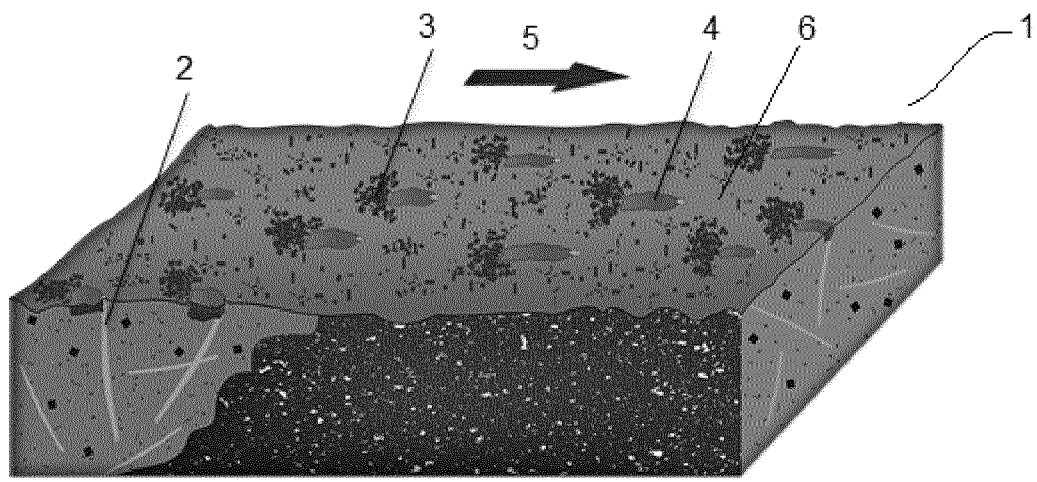
FIG. 1 shows a schematic of formation of primary and secondary plateaus associated with a friction material containing MMVF.
Figure 2:
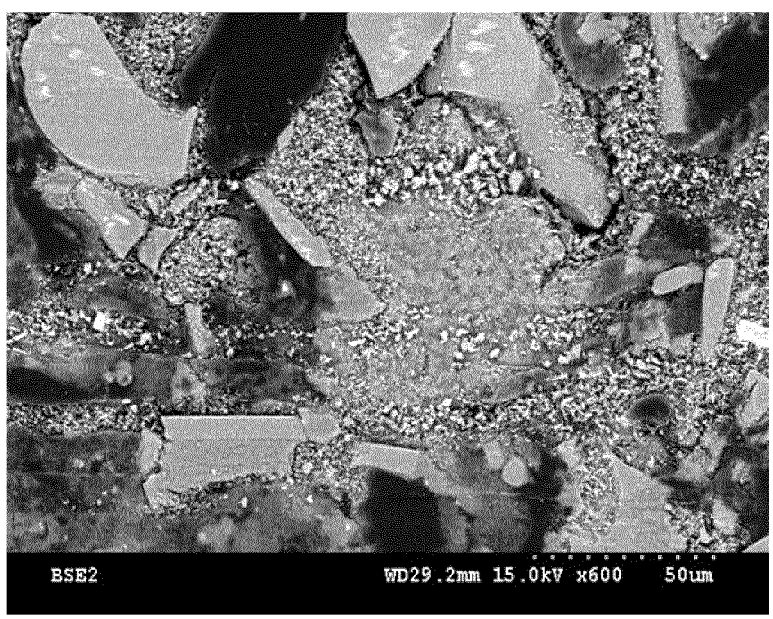
FIG. 2 is an SEM image showing primary and secondary plateaus associated with a friction material according to the invention.

Primary plateaus (exposed fibre parts at the friction material surface) and secondary plateaus (the accumulation of wear debris in the vicinity of primary plateaus) can be seen in FIGS. 1 and 2. FIG. 1 outlines the mechanism by which secondary plateaus (4) and a third body layer may form during use of the friction material. The surface (6) of the friction material (1) slides in the direction (5) against another surface of the friction couple (not shown). Primary plateaus (2) are present at the surface (6) where the MMVF is exposed at the surface (6). Wear debris (3) collects at the primary plateaus (2) to form secondary plateaus (4). This may help to reduce dust emissions, since wear debris collect in secondary plateaus (4) and may also improve the stability of the coefficient of friction as secondary plateaus (4) may contribute to the formation of a stable third body layer. FIG. 2 is an SEM image showing the formation of secondary plateaus on a real sample of a friction material according to the invention.

The fibre length and the fibre diameter as used in this application refer to the number mean length and number mean diameter, respectively. The diameter and the length of the fibres can be measured automatically using a microscope with camera and image analysing software as is known to the skilled person.

Preferably the MMVF have a Moh hardness of from 2 to 5, preferably from 3 to 4, for example approximately 3.5.

Preferably the friction material comprises from 1 to 30 vol % MMVF, preferably from 1 to 20 vol % MMVF, more preferably from 3 to 15 vol % MMVF, more preferably from 4 to 10 vol % MMVF, most preferably from 5 to 9 vol % MMVF.

The MMVF are preferably obtained from a melt spinning process. In preferred melt spinning processes, a mineral melt is flung from the external surfaces of sets of rotors spinning on horizontal axes to form mineral wool. The mineral wool is collected and processed into shorter fibres, for example by chopping and/or pressing, and to remove shot to the desired levels, as is known in the art. The chemical composition of the fibres and the control of the fibre diameter are controlled by using appropriate starting materials, melt temperatures, melt viscosities and spinning parameters as is known in the art.

Preferably the matrix is a non-asbestos, copper-free matrix. Copper-free matrices are preferred in order to meet current and future regulatory requirements to reduce and eventually eliminate copper from car brakes in particular.

Preferably the matrix is a low-steel or no-steel matrix. This means that the matrix contains no, or only low, amounts of steel fibres. In particular, the matrix may contain no more than 20 wt % of steel fibres, preferably no more than 15 wt % steel fibres, more preferably less than 10 wt % steel fibres. The matrix may be free from steel fibres (no-steel matrix). Some prior art friction materials used steel fibres where the present invention uses MMVF. Steel fibres are disadvantageous due to rusting, dust, noise and vibration harshness and increased weight of the friction material.

Preferably the matrix comprises a lubricant, an abrasive, a binder, reinforcing fibres and a filler. The abrasive in the matrix is preferably a different material to the MMVF in the friction material.

Suitable abrasives include metal oxides and silicates, including quartz, alumina, zirconium silicate, zirconium oxide and chromium oxide. Abrasives may be chosen depending on the hardness required. The amount of abrasives in the friction material may be from 1 to 20, preferably from 5 to 17, more preferably from 8 to 14 vol % of the friction material.

Suitable lubricants include solid lubricants such as graphite and metallic sulphides such as antimony sulphide, tin sulphide, copper sulphide and lead sulphide. A lubricant may be included in an amount of from 1 to 20, preferably from 5 to 17, more preferably from 8 to 14 vol % of the friction material.

Suitable binder raw materials include thermosetting organic binding agents such as phenolic resins, phenol-formaldehyde resins, condensed polynuclear aromatic resins, silicone-modified resins, phenolic siloxane resins, cyanate ester resins, epoxy-modified resins, acrylates, methacrylate, alkyd resins, polyester resins, polyurethanes, cellulose esters, polyvinyl resins, polystyrene resins, nitrocellulose, chlorinated rubbers, styrene butadiene rubber and polyimide resins and may also include curing agents, cross-linkers and solvents. Particularly preferred binders are phenolic resins such as phenol-formaldehyde (Novolac) family resins. The binder may also include a toughener such as epoxy resin.

Preferably the matrix comprises an organic thermoset resin acting as a binder. Particularly suitable organic thermoset resins include phenolic resins such as phenol formaldehyde resins.

The binder may be present in an amount of from 5 to 45 vol %, preferably from 5 to 25 vol %, more preferably from 10 to 20 vol % of the friction material.

Fillers may be organic, inorganic, or a mixture of organic and inorganic. Fillers are added to increase the volume of the friction material. Suitable fillers include calcium silicates (e.g. Promaxon®), friction dust, rubber crumb, potassium titanates (e.g. in whisker or fibre form), barium sulphate, calcium carbonate, mica, vermiculite, alkali metal titanates, molybdenum trioxide, cashew dust, sillimanite, mullite, magnesium oxide, silica and iron oxide. The fillers may play a role in modifying some characteristics of the friction material, for example they may enhance the heat stability or noise reduction. The specific filler or fillers to be used may also depend on the other constituents of the friction material. Mica, vermiculate, cashew dust and rubber dust are known as noise suppressors. Preferred fillers include barites such as $BaSO_4$, petrol coke, $Ca(OH)_2$, mica, vermiculite, iron powder, rubber crumb, calcium silicates and potassium titanates (e.g. in whisker or fibre form). Calcium silicates such as Promaxon® may be used to improve the mechanical strength of the friction product, as described in U.S. Pat. No. 4,994,506.

Suitable reinforcing fibres, other than the essential MMVF, may be added to the matrix. For example, the matrix may include aramid fibres such as Kevlar®. The additional fibres may be added for example to increase the Young's modulus and to increase the toughness of the friction material.

Fibres other than the essential MMVF may be included in an amount of from 0 to 10 vol %, preferably from 1 to 10 vol %, more preferably from 3 to 7 vol % of the friction material.

Preferably the friction material comprises from 85 to 97 vol % matrix.

Preferably the matrix is essentially free of electrically conductive polymers. In particular, the matrix preferably does not contain doped conjugated polymers selected from polypyrrole, polyaniline, polythiophenes, polyacetylenes, polyfluorines, polyphenylenes, polypyrenes, polyazulenes, polynaphthalenes, polycarbazoles, polyindoles, polyazepines, poly(p-phenylene vinylene) and poly(3,4-ethylenedioxythiophene)poly(styrenesulphonate) (PEDOT: PSS).

In the second aspect of the invention, a method of making the friction material of the first aspect of the invention comprises the steps:
mixing MMVF and matrix raw materials to form a mixture;
subjecting the mixture to above-ambient pressure to form a compact; and
heating the compact and form the friction material.

Preferably, the MMVF used in the mixing step have undergone shot removal treatment, such that the MMVF contains no more than 0.5 wt % shot particles of size >125 µm.

Preferably, the matrix raw materials include binder raw materials that are cured during the heating step.

Preferably, the step of mixing MMVF and matrix raw materials to form a mixture comprises the sub-steps:
mixing the MMVF with a filler and any other fibres; and
adding in remaining components and mixing to form the mixture.

Preferably the mixture is dry. In this case, the binder raw materials are dry prior to curing. This may help improve the strength of the friction material, as there is no residual moisture. The mixing process may be considered to be a dry mixing process.

Preferably the method uses matrix raw materials are free from wet ingredients.

These sub-steps of the mixing steps may aid uniform separation of the MMVF, helping to increase the homogeneity of the friction material.

EXAMPLES

Example 1 (Invention)

A brake disc pad was formulated as follows:

TABLE 1

| Component | Volume % |
|---|---|
| Novolac resin | 16 |
| Aramid fibres | 5 |
| Solid lubricants | 11 |
| Friction dust/rubber crumb | 10.5 |
| Potassium titanates | 17.5 |
| Abrasives | 11 |
| MMVF | 5.5 |
| Calcium silicate (PROMAXON (RTM) -D) | 5.5 |
| Fillers | 18 |
| Total | 100 |

The chemical composition of the MMVF was determined using a XRF-Axios EP 264 spectrometer for X-ray fluorescence analysis. The composition was found to be as follows:

TABLE 2

| Component | Wt % |
|---|---|
| $SiO_2$ | 39.8 |
| $Al_2O_3$ | 19.0 |
| $TiO_2$ | 0.5 |
| $Fe_2O_3$ | 0.8 |
| CaO | 32.8 |
| MgO | 5.2 |
| $Na_2O$ | 1.2 |
| $K_2O$ | 0.4 |
| $P_2O_5$ | 0.2 |
| MnO | 0.1 |

The MMVF used in example 1 had the following fibre properties:

TABLE 3

| Fibre length (avg.) [μm] | 303 |
|---|---|
| Diameter (num. avg.) [μm] | 4.0 |
| Aspect ratio [FL/FD] | 76 |
| Shot >45 μm [% wt] | 1.9 |
| >63 μm [% wt] | 0.9 |
| >125 μm [% wt] | <0.1 |
| Specific density [g/cm3] | 2.71 |

To prepare the brake disc pad, first the aramid fibres and mineral fibres were dispersed by mixing with graphite (a solid lubricant) and fillers for two minutes. Next, the remaining raw materials listed in table 1 were added to the mixture for an additional two minutes of mixing time. Mixing was carried out using a multiple blade, high-speed vertical MTI laboratory mixer at 2000 rpm. A mixture was formed.

The mixture was processed in a positive mould for five minutes under a pressure of 290 kg/cm² at 160° C. to form a compact.

The compact was cured for four hours at a constant temperature of 210° C. to produce friction materials, in this case brake disc pads. The brake disc pad was ground in order to achieve a flat surface and acclimatised for 24 hours at 23° C. and 50% relative humidity.

Example 2 (Comparative)

Another brake disc pad was prepared for comparison with the brake disc pad of example 1. The relative amount of each component was the same as in example 1. The production method was the same as in example 1. The MMVF used in example 2 had a chemical composition as shown in table 4.

TABLE 4

| Component | Wt % |
|---|---|
| $SiO_2$ | 42.7 |
| $Al_2O_3$ | 18.5 |
| $TiO_2$ | 1.3 |
| $Fe_2O_3$ | 7.7 |
| CaO | 20.6 |
| MgO | 6.0 |
| $Na_2O$ | 2.2 |
| $K_2O$ | 0.6 |
| $P_2O_5$ | 0.2 |
| MnO | 0.2 |

The known MMVF used in example 2 had the following fibre properties:

TABLE 5

| Fibre length (avg.) [μm] | 306 |
|---|---|
| Diameter (num. avg.) [μm] | 5.2 |
| Aspect ratio [FL/FD] | 59 |
| Shot >45 μm [% wt] | 0.9 |
| >63 μm [% wt] | 0.3 |
| >125 μm [% wt] | <0.1 |
| Specific density [g/cm³] | 2.75 |

A Krauss wear test was carried out at temperatures 150, 300 and 500° C. The wear of the friction materials of examples 1 and 2 can be seen in FIG. 5 and the wear of the rotor that formed the friction couple surface can be seen in FIG. 6.

Discussion, Examples 1 and 2

Fibre length and fibre diameter measurements were performed using a Carl Zeiss Axioskop 2 with an AxioCam digital camera for image processing.

For shot measurements a Hosokawa Alpine 200LS-N air jet sieve was used with sieves of 45, 63 and 125 μm.
instrument between 40 and 900° C. at a heating rate of 10° C./min in air.

Efficiency performance was evaluated using a Horiba dynamometer according to SAE J2522. The pads were scorched, but did not contain an anti-noise shim, slot or chamfer. The brake system used for friction performance and wear testing was the front brake of a VW Golf (WVA21974), using a ventilated disc and inertia of 65 kg·m².

A Krauss machine was used for wear testing as a function of temperature. First all brake pads were analysed according to the ECE R90 annex 8 procedure (constant torque).

Temperature block tests were then carried out at 100, 300 and 500° C. adapted from the SAE J2707 wear procedure.

Porosity can be determined by comparing the theoretical density of the friction material, weighted using reference values for each component, against the actual density of the friction material calculated by measuring the dimensions and mass of the friction material.

Tables 2 and 4 clearly show the difference in fibre chemistry between the MMVF of the invention in example 1 and the known MMVF used in example 2. The new chemistry contains a lower amount of iron oxide and has a higher amount of calcium oxide. Other oxide contents are for both fibre grades in the same range.

This new chemical composition also ensures the bio-solubility of the fibres; the values comply with the EUCEB and RAL EUCEB (regular independent sample taking, testing chemistry).

Table 6 shows the measured hardness and calculated Vickers and Moh hardnesses of the fibres used in examples 1 and 2. As can be seen, the fibres used in the invention (example 1) are not as hard as the known fibres demonstrated by example 2.

Table 7 show the measured material properties of the brake pads (friction material) prepared in examples 1 and 2.

Both samples show similar values for density and porosity of the friction material.

Hardness of the MMVF was calculated by means of a high resolution nanomechanical test instrument (Hysitron, Inc.) that performs nano-scale quasi-static indentation by applying a force to an indenter tip while measuring tip displacement. During indentation, the applied load and tip displacement are continuously controlled and/or measured, creating a load-displacement curve for each indent. From the load-displacement curve, nano-hardness and reduced elastic modulus values can be determined by applying the Oliver and Pharr method and a pre-calibrated indenter tip area function and a pre-determined machine compliance value. International standards ISO14577 and ASTM E2546-07 are relevant for the nano-indentation hardness testing procedure.

A concordance between hardness scales can be found at http://www.cidraprecisionservices.com/mohs-conversion-.html

TABLE 6

|  | Hardness (GPa) | Vickers Hardness (kgf/mm$^2$) | Moh Hardness |
| --- | --- | --- | --- |
| Example 1 | 2.06 | 195 | 3.5 |
| Example 2 | 7.25 | 685 | 5.5 |

Hardness measurements were carried out at 10 different points on the friction material surface. There was no significant difference between examples 1 and 2 and standard deviations are in the same measurement range. This shows that the friction material of the invention maintains the hardness of the friction material achieved by including known MMVF.

TABLE 7

| Material property | Example 1 | Example 2 |
| --- | --- | --- |
| Density [g/cm$^3$] | 2.24 | 2.26 |
| Hardness [HRS] | 80 stdev 6 | 83 stdev 9 |
| Porosity [%] | 19.3 | 18.7 |

Figure 3:
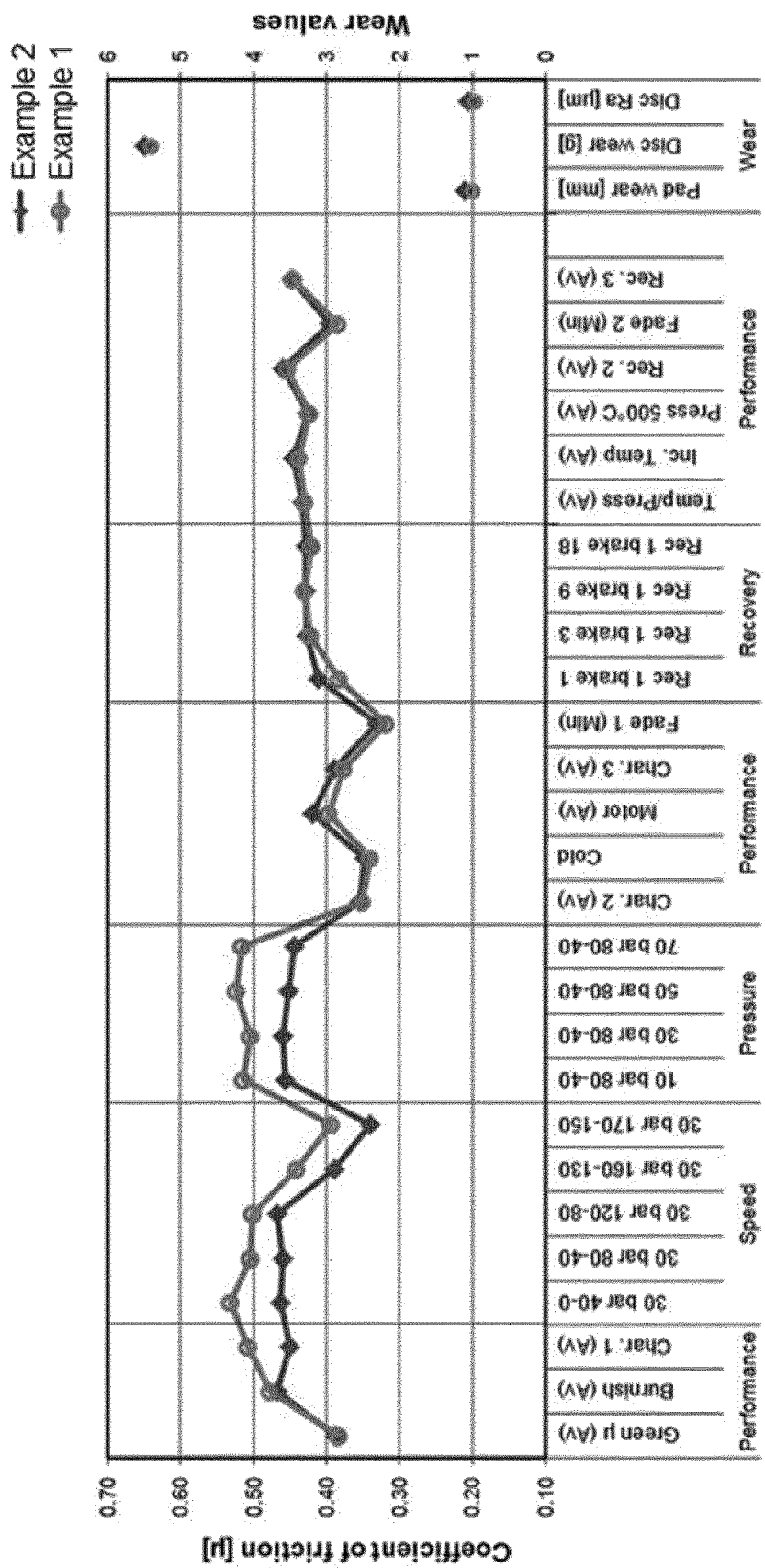
FIG. 3 is a graph comparing the mechanical performance of a friction material according to the invention with a friction material using known MMVF.

Efficiency and wear tests were carried out with the friction materials produced. FIG. 3 shows a comparison between the summary of the AK-Master test results for examples 1 and 2.

The friction material of example 1 (according to the invention) shows a higher friction level for speed and pressure sensitivity sections compared to the comparative friction material of example 2. The other sections of the efficiency test show similar performance levels. The difference in wear values is not significant. The results of the new fibres clearly show that a higher friction coefficient does not adversely affect the wear.

Temperature block tests were performed to evaluate the effect of the newly developed bio-soluble fibres on pad and disc wear. Prior to this test, all samples were analysed according to ECE R90 to compare the friction level of the different friction materials and correlate this to wear results.

Figure 4:
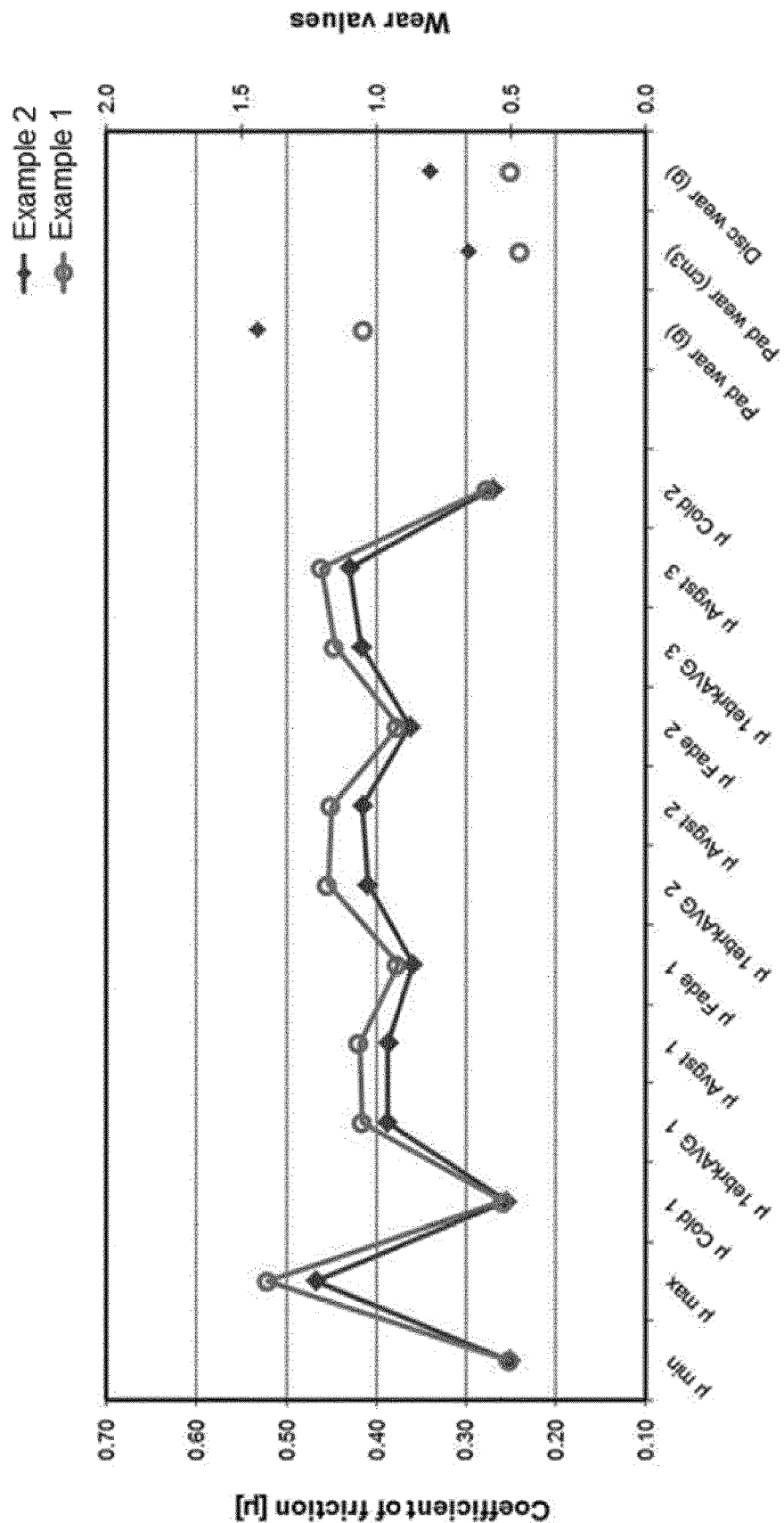
FIG. 4 is a graph comparing the coefficient of friction and wear results measured for examples 1 and 2.

Friction and wear results measured for examples 1 and 2 can be seen in FIG. 4. The friction pad according to the invention, example 1, shows better performance across the board compared to comparative example 2, with both a consistently higher coefficient of friction and a lower wear rate.

The test results show that the friction material of example 1, including the MMVF according to the invention, has a significant contribution to performance and wear aspects. The MMVF used in example 1 is a bio-soluble fibre composition and is less aggressive to the disc surface than the MMVF used in example 2. The lower amount of iron oxide and higher amount of calcium oxide of the MMVF of example 1 as compared to the known MMVF type used in example 2 results in less abrasive fibre behaviour. As a result the friction material of example 1 may improve the lifetime of the brake pad and disc compared to example 2.

Another positive aspect of the invention is the specific fibre diameter. Because of the process settings and viscosity of the melt, this chemistry results in fibres with a typically smaller average fibre diameter. This diameter results in a higher fibre aspect ratio (FL/FD) for fibres with similar length. A higher fibre aspect ratio improves their mechanical micro reinforcement capacity as has been proven in theory (Hameed, R., Turatsinze, A., Duprat, F., Sellier, A., "Metallic fiber reinforced concrete: effect of fiber aspect ratio on the flexural properties", ARPN Journal of Engineering and Applied Science, Vol. 4, No. 5, 2009).

In addition to this known effect, the smaller diameter compared to the MMVF used in example 2 results in an increased amount of mineral fibres in the same mixture volume. This leads to more fibres per gram, which theoretically improves reinforcement and may result in the formation of more primary plateaus and as a consequence more secondary plateaus. The promotion of a third body layer may be enhanced and as a consequence this anchoring effect may improve friction stability and increases wear resistance. As a result, friction coefficient may be increased without compromising wear results.

The number of mineral fibres of the MMVF used in example 1 is almost twice as large as the quantity of the existing bio-soluble fibre product used in example 2: 1 gram of fibre material contains an average of 56 million loose MMVF in example 2, but when calculated for example 1, of the invention, it has 97 million loose fibres. The results show the contribution of an increased number of fibres on friction stability and wear.

When taking into account the fact that the overall friction coefficient is higher for the new fibre grade, the wear results could even improve and should show larger differences in comparison to commercially available fibre grades, in which case friction levels will become equal. In this case the mineral fibre will provide various functionalities; the fibre will act as an anchoring point and gives micrometric reinforcement at the surface of the friction material, it will promote third body layer formation and will function as adhesive material in the formula.

Figure 5:
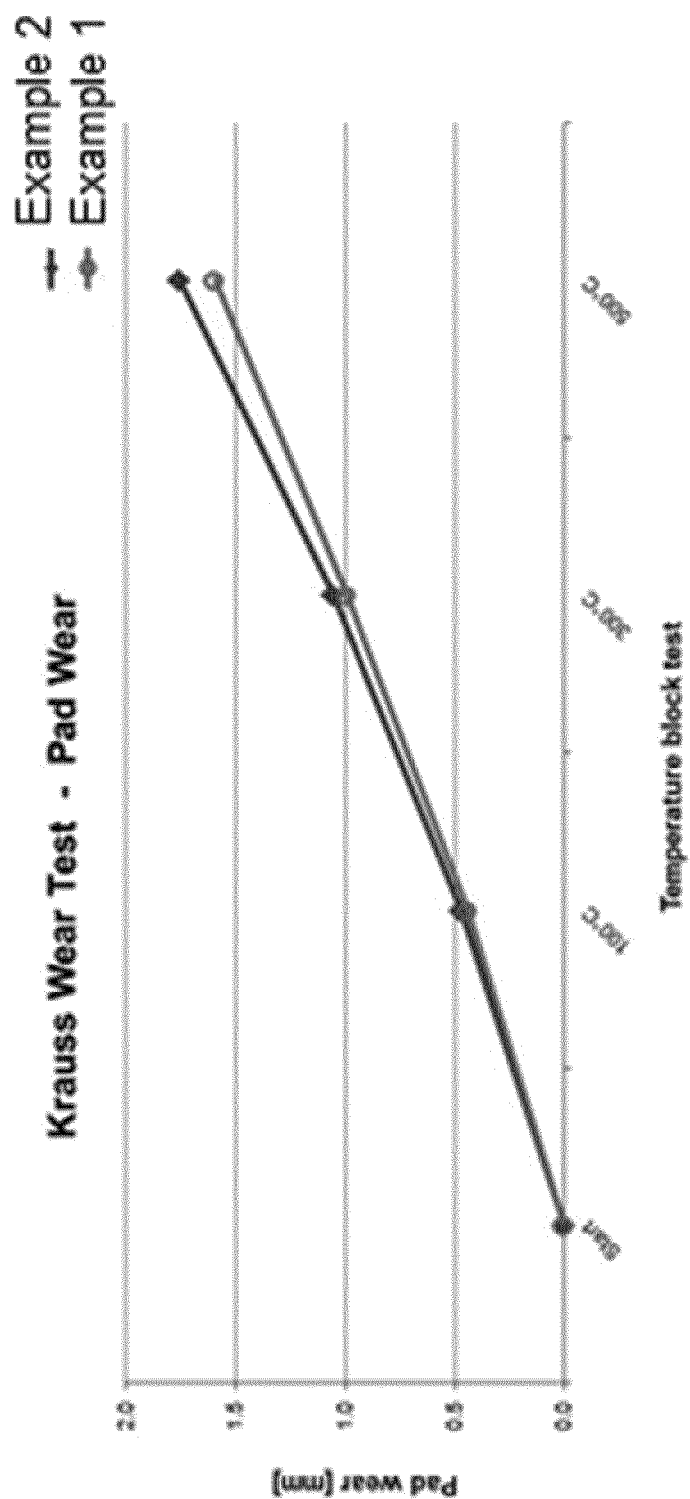
FIG. 5 is a graph showing the wear of the friction material of examples 1 and 2 in a Krauss wear test.
Figure 6:
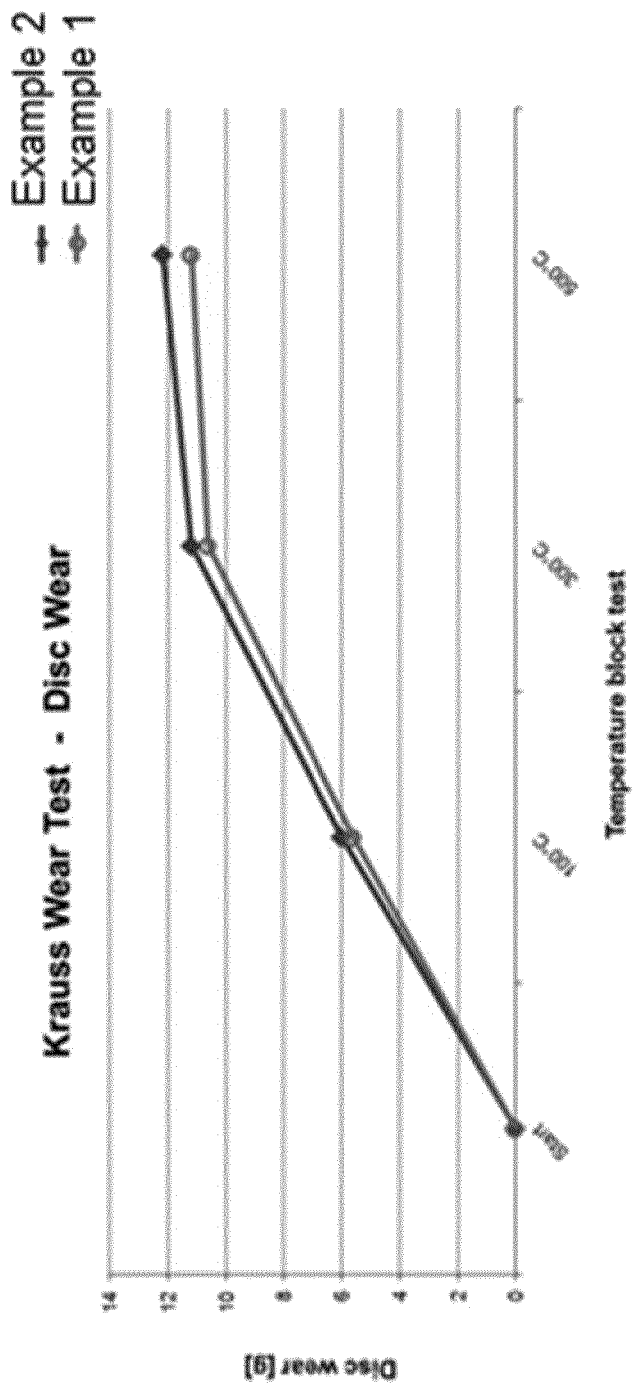
FIG. 6 is a graph showing the wear of the surface of the rotor that forms a friction couple with the friction material of examples 1 and 2 is a Krauss wear test.

FIGS. 5 and 6 show that surprisingly the friction material of the invention (example 1) exhibits lower wear than the known friction material of example 2. This is unexpected because a higher iron content in MMVF is generally associated with high temperature resistance, yet at the highest temperature tested here, the MMVF of the invention, which has a very low iron content, performed better, i.e. lower wear of both friction couple surfaces. Total wear over all three temperatures for the friction material (brake pad) was approximately 10% lower than for the known friction material. Total rotor wear was approximately 1 g lower when using the friction material of the invention.

Overall, the fibres play a major role in the friction matrix. The correct combination of anchoring materials and materials promoting the formation of a third body layer improves friction level, friction stability and wear behaviour of NAO copper-free friction materials for passenger car disc pads. The introduction of this new fibre grade used in example 1 demonstrates the possibility of reducing disc and pad wear, while the friction performance remains at the same level.

Examples 3, 4 and 5

Three samples of MMVF were prepared, each with the same chemical composition and the same average fibre diameter of 4 µm, but differentiated by average fibre length. Some physical characteristics of these fibres (MMVF) are listed in table 8 below.

TABLE 8

| Property | Example 3 | Example 4 | Example 5 |
| --- | --- | --- | --- |
| Fibre length (number average) | 127 µm | 303 µm | 505 µm |
| Fibre aspect ratio (length/diameter) | 31 | 76 | 125 |
| Shot content >125 µm | 0.11 wt % | 0.10 wt % | 0.12 wt % |

The chemical composition of the MMVF of examples 3, 4 and 5 was the same as for example 1.

Brake pads were prepared using a standard formulation to compare the tribological performance of the MMVF of each of examples 3, 4 and 5. The composition of the brake pads was as follows:

TABLE 9

| Component | Volume % |
| --- | --- |
| MMVF of example 3, 4 or 5 | 8 |
| Novolac resin | 16 |
| Aramid fibres | 5 |
| Solid lubricants | 11 |
| Friction dust/rubber crumb | 10.5 |
| Potassium titanates flake form | 17.5 |
| Abrasives | 11 |
| Calcium silicate (PROMAXON (RTM) -D) | 5.5 |
| Fillers | 15.5 |
| Total | 100 |

Brake pads with the compositions of table 9 were prepared according to the method used in example 1. The brake pads were found to have the properties shown in table 10.

TABLE 10

| Property | Example 3 brake pad | Example 4 brake pad | Example 5 brake pad |
| --- | --- | --- | --- |
| Density | 2.23 g/cm$^3$ | 2.22 g/cm$^3$ | 2.19 g/cm$^3$ |
| Porosity | 16.1% | 17.8% | 20.3% |

It can be seen that the porosity of the friction material increases with fibre length of the MMVF. This may be explained by the folding over of longer MMVF to form cage or nest structures. These structures introduce porosity into the friction material, which may be advantageous in acting as a trap for wear debris and in facilitating the formation of secondary plateaus and a third body layer. On the other hand, shorter fibres may increase the number of primary plateaus per unit area of the surface of the friction material, thus improving stability of the coefficient of friction. A combination of long and short fibres may advantageously be used to obtain both of these benefits.

TABLE 11

| Friction material | Rotor wear (g) | Fibre length (µm) | Fibre aspect ratio |
| --- | --- | --- | --- |
| Example 3 | 5.6 | 127 | 31 |
| Example 4 | 5.3 | 303 | 76 |
| Example 5 | 4.9 | 505 | 125 |

TABLE 12

| Friction material | Pad wear (g) | Rotor wear (g) | Rotor roughness |
| --- | --- | --- | --- |
| 150° C. | | | |
| Example 3 | 4 | 3.9 | 1.45 |
| Example 4 | 3.8 | 3.6 | 1.08 |
| Example 5 | 3.8 | 3.1 | 1.06 |
| 300° C. | | | |
| Example 3 | 3.8 | 2.1 | 1.94 |
| Example 4 | 3.6 | 2 | 1.83 |
| Example 5 | 2.9 | 1.8 | 1.81 |
| 500° C. | | | |
| Example 3 | 11.7 | 7.8 | 3.95 |
| Example 4 | 11.3 | 7.4 | 4 |
| Example 5 | 11 | 6.7 | 3.55 |

TABLE 13

| Friction material | Total pad wear (g) | Total rotor wear (g) |
| --- | --- | --- |
| Example 3 | 19.5 | 13.8 |
| Example 4 | 18.7 | 13 |
| Example 5 | 17.7 | 11.6 |

As the data shows, there is a noticeable difference in rotor roughness associated with the change in fibre length. Long fibres affect the rotor surface roughness less than short fibres do. This observation, in combination with the results of efficiency, noise and wear suggest that different mechanisms of third body layer formation could be involved:

(a) a mechanical effect due to load bearing properties of fibres; this effect is proposed for short fibres, which have a higher number per unit area at the surface of the friction material and can thus provide more anchoring points than long fibres;

(b) an accumulation effect of long lasting third body layers in a network produced by fibre cages in the friction material surface; this effect is proposed for long fibres;

(c) medium fibres may show a combination of effects (a) and (b).

In summary, friction materials prepared according to the invention have improved tribological performance compared to known friction materials that contain fibres of a different chemical composition. Further enhancement of the properties of the friction material can be achieved when the fibre length and thus fibre aspect ratio are fine-tuned, due to the effect that the different microscopic properties of the friction material have on its the macroscopic properties when the fibre aspect ratio is varied.

The invention claimed is:

1. A friction material comprising man-made vitreous fibres (MMVF) dispersed in a matrix, the MMVF comprising:
   less than 2 wt % $Fe_2O_3$
   30-40 wt % MgO+CaO
   35-45 wt % $SiO_2$
   17-24 wt % $Al_2O_3$
   1-5 wt % $K_2O+Na_2O$,
   wherein the MMVF have a number mean diameter of from 3 to 5 µm,
   wherein the MMVF are present in an amount of from 3 to 15 vol %.

2. The friction material of claim 1, wherein the MMVF have a number mean diameter of from 3.5 to 4.5 µm.

3. The friction material of claim 1, wherein the MMVF have a number mean length of from 100 to 600 µm.

4. The friction material of claim 1, wherein the MMVF comprises:
   less than 1.5 wt % $Fe_2O_3$
   34-39 wt % MgO+CaO
   37-43 wt % $SiO_2$
   18-23 wt % $Al_2O_3$
   2-4 wt % $K_2O+Na_2O$.

5. The friction material of claim 1, wherein the matrix is a non-asbestos, copper-free matrix.

6. The friction material of claim 1, wherein the matrix comprises no greater than 20 wt % steel fibres.

7. The friction material of claim 1, wherein the matrix comprises a lubricant, an abrasive, a binder and a filler.

8. The friction material of claim 1, wherein the friction material comprises from 5 to 17 vol % abrasives, from 0 to 10 vol % non-MMVF reinforcing fibres, from 5 to 17 vol % lubricants and from 5 to 25 vol % binder.

9. The friction material of claim 1, wherein the binder comprises an organic thermosetting resin.

10. The friction material of claim 1, wherein the matrix is free from electrically conductive polymer.

11. A method of making the friction material of claim 1, the method comprising:
    mixing MMVF and matrix raw materials to form a mixture; wherein the MMVF comprises less than 2 wt % $Fe_2O_3$, 30-40 wt % MgO+CaO, 35-45 wt % $SiO_2$, 17-24 wt % $Al_2O_3$, 1-5 wt % $K_2O+Na_2O$; and wherein the MMVF have a number mean diameter of from 3 to 5 µm;
    subjecting the mixture to above-ambient pressure to form a compact; and
    heating the compact to form the friction material, wherein the MMVF are present in an amount of from 3 to 15 vol %.

12. The method of claim 11, wherein the step of mixing MMVF and raw material to form a mixture comprises the sub-steps:
    mixing the MMVF with a filler and any other fibres; and
    adding in remaining components and mixing to form the mixture.

13. The method of claim 11 wherein the matrix raw materials comprises binder raw materials that are curable during the heating step and wherein the matrix raw materials are cured in the heating step.

14. The method of claim 11, wherein the MMVF comprises no more than 0.5 wt % shot of size >125 µm.

15. The method of claim 11, wherein the MMVF comprises no more than 1.5 wt % shot of size >63 µm.

* * * * *